United States Patent [19]
Smith et al.

[11] 4,284,329
[45] Aug. 18, 1981

[54] LASER GYROSCOPE SYSTEM

[75] Inventors: Irl W. Smith; Terry A. Dorschner, both of Newton, Mass.

[73] Assignee: Raytheon Company, Lexington, Mass.

[21] Appl. No.: 51,557

[22] Filed: Jun. 25, 1979

Related U.S. Application Data

[62] Division of Ser. No. 868,096, Jan. 3, 1978, abandoned.

[51] Int. Cl.³ .......................... G02F 1/09; G01B 9/02
[52] U.S. Cl. ................................... 350/375; 356/350
[58] Field of Search ........................ 350/151; 356/350; 331/94.5 D

[56] References Cited
U.S. PATENT DOCUMENTS

| | | | |
|---|---|---|---|
| 3,245,314 | 4/1966 | Dillon, Jr. | 350/151 |
| 3,436,745 | 4/1969 | Knox | 350/151 |

OTHER PUBLICATIONS

Houston, E. J., "Electricity & Magnetism," 2nd edition, McGraw Pub. Co., New York, 1899, pp. 139–140.
Polgreen, G. R., "New Applications of Modern Magnets", MacDonald, London, 1966, pp. 61–65.

*Primary Examiner*—William H. Punter
*Attorney, Agent, or Firm*—Vincenzo D. Pitruzzella; Joseph D. Pannone; Milton D. Bartlett

[57] ABSTRACT

A four-frequency laser gyroscope system having improved accuracy is constructed using a single solid block of low thermal coefficient of expansion material. A four-segment nonplanar propagation path provides a first frequency splitting. A second splitting is provided by a Faraday rotator having a thin slab of rare earth-doped glass positioned within an aperture in a permanent magnet. A narrow angle of incidence is provided for the beams of incident upon the output mirror to prevent cross coupling between beams within the output optics structure. Blocking the gaseous flow path reduces output frequency drift caused by contaminating particles.

6 Claims, 10 Drawing Figures

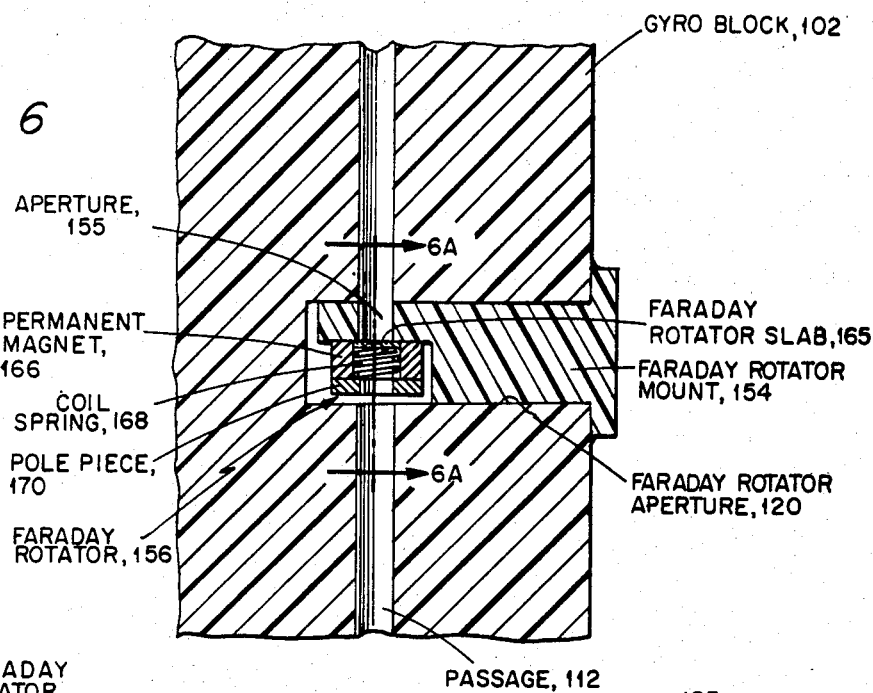
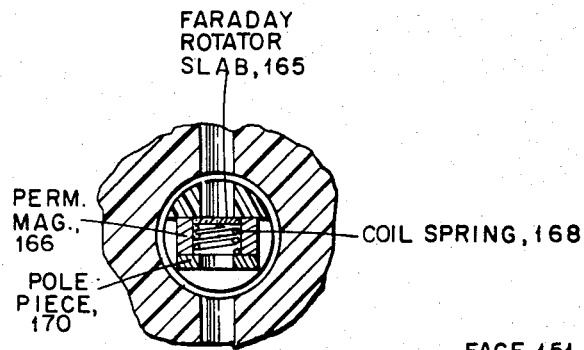
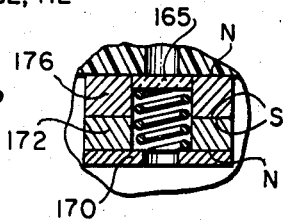
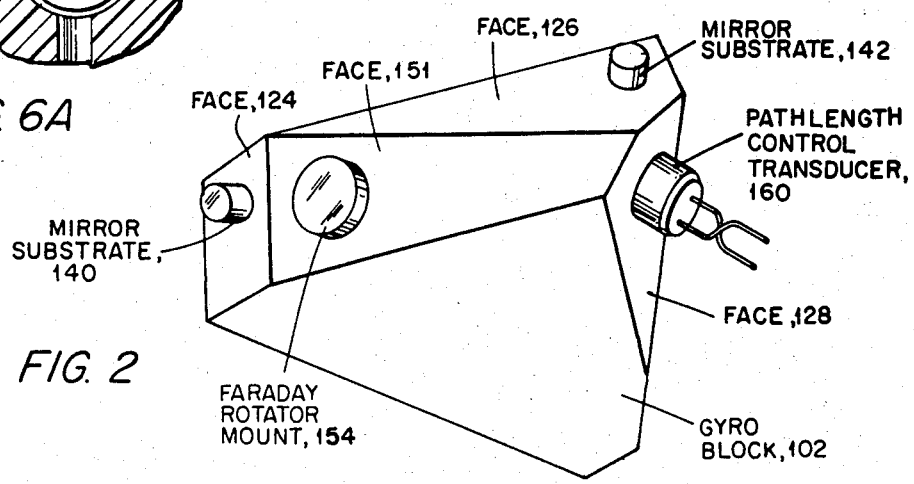

LASER GYROSCOPE SYSTEM

CROSS-REFERENCE TO RELATED APPLICATIONS

This is a division of application Ser. No. 868,096, Filed Jan. 3, 1978 now abandoned.

This application contains subject matter in common with U.S. patent application Nos. 646,307, now abandoned and 646,308 filed Jan. 2, 1976, now U.S. Pat. No. 4,110,045 the benefit of the filing date being hereby claimed for the common subject matter.

BACKGROUND OF THE INVENTION

1. Field of the Invention

The invention pertains broadly to the field of laser gyroscopes. More particularly, the invention pertains to four-frequency laser gyroscope systems having effectively two laser gyroscopes operating simultaneously with a common propagation path.

2. Description of the Prior Art

The operation of a basic four-frequency laser gyroscope is described in U.S. Pat. No. 3,741,657 issued June 26, 1973 to K. Andringa and assigned to the present assignee. In such systems as described in the referenced patent, waves of four distinct frequencies propagate around a closed propagation path defined by three or more mirrors. Two of these beams circulate around the closed propagation path in the clockwise direction while the other two circulate in the counterclockwise direction. One of the clockwise beams and one of the counterclockwise beams are of a first polarization sense while the other one of the clockwise and the other one of the counterclockwise beams are of another polarization sense. For example, the first clockwise beam and first counterclockwise beam may be of right-hand circular polarization while the second clockwise and second counterclockwise beams may be of a left-hand circular polarization. The two right-hand circularly polarized beams may be, for example, of the highest two frequencies while the two left-hand circularly polarized beams may be of the lowest two frequencies.

Rotation of the laser gyroscope about its sensitive axis causes the two right-hand circularly polarized beams to become further apart in frequency than at the rest state while the two left-hand circularly polarized beams become closer together in frequency. The opposite frequency shifts occur for the opposite direction of rotation. As shown in the referenced path, the difference between the frequency shifts in the right-hand circularly polarized beams and the left-hand circularly polarized beams is directly proportional to the rate of rotation of the system. The time integral of this difference is directly proportional to the total amount of rotation about the sensitive axis.

Two separate means are provided within the propagation path for producing frequency splitting in order to maintain the beams of four separate frequencies. In the system described in the referenced patent, a crystal rotator provides a split between the average of the frequencies of the right and left-hand circularly polarized beams. This split is accomplished by the crystal providing a phase delay for circularly polarized waves that is different for one sense of circular polarization than for the opposite sense and is reciprocal. A Faraday rotator further provides the frequency split between the frequencies of the clockwise and counterclockwise beams of like polarization. The Faraday rotator is non-reciprocal providing different phase delays for waves of the same polarization states propagating in opposite directions.

Although the system of the referenced patent has been found to function quite well, it has been found desirable to provide still further improvements. For example, it is desirable to eliminate as much solid material from the propagation path as possible as presence of any solid material within the path provides scattering centers from which light may be undesirably coupled from one beam to another thereby inducing output frequency drift into the system. Furthermore, it is desirable to provide a laser gyroscope system in which the coupling between beams of the opposite sense of polarization at the output detector is substantially eliminated.

SUMMARY OF THE INVENTION

Accordingly, it is an object of the present invention to provide a laser gyroscope system having a minimum amount of material and hence scattering sites disposed within the propagation path of the circulating beams.

Furthermore, it is an object of the invention to provide a laser gyroscope in which unwanted coupling between beams incident upon an output detector are minimized.

Also, it is an object of the present invention to provide a laser gyroscope system in which drift due to flow of the gaseous gain medium is minimized. These, as well as other objects of the invention, may be met by providing the combination of means for providing a closed nonplanar propagation path sustaining electromagnetic waves and means for producing an indication of the rate of rotation of said path providing means. As herein used the term closed propagation path relates to a re-entrant path having a nonzero area projected upon some plane. The indication is preferably in the form of one or more electrical signals which have a parameter such as frequency or amplitude which varies in accordance with the rate of rotation. Digital signals may be so employed. Waves of at least two distinct frequencies propagate around the closed path. The indication means may produce a signal having a frequency substantially proportional to the difference in frequency between at least two of said waves. If waves of four frequencies are used, the indication may be in proportion to the difference between two differences between a separate two of the waves. In preferred embodiments, the waves are substantially circularly polarized. Four or more reflecting means may be used to provide the closed path. Objects of the invention may further be met by providing the combination of a closed nonplanar propagation for electromagnetic waves and means for providing different delays for waves propagating in opposed directions around said closed path. Means may also be provided for extracting a portion of the waves propagating around said closed path and for producing at least one output signal in response to the extracted portion of the waves. In one preferred embodiment, the means for providing different delays may comprise a Faraday rotator.

In a preferred embodiment the invention may be practiced with the combination of means for providing a closed nonplanar propagation path for electromagnetic waves and means disposed in the path for delaying waves propagating in different directions along the path by different amounts of time, the delaying means comprising a slab of material having a thickness of less than 0.5 mm. Means should be provided for producing a magnetic field within the slab. The slab material has a preferred Verdet constant in excess of 0.25 min./cm. Oe. the operating wavelength. A glass with an appropriate rare-earth dopant will fulfill this purpose. Also, objects of the invention may be met by providing the combination of means for forming a closed path for propagation of electromagnetic waves and means for coupling a portion of the waves out of the path with the waves incident upon the coupling means having an angle between them of thirty degrees or less. The means for forming the closed path preferably comprises a block of solid material having a plurality of passages provided therein along which the electromagnetic waves may propagate. Reflecting means are positioned at the intersections of the passages. One of the reflecting means may be partially transmitting for performing the function of coupling a portion of the waves out of the path. Preferably, the closed path is nonplanar; that is, the various segments of the closed path do not lie within a single plane.

Moreover, objects of the invention may be met by providing the combination of a plurality of reflecting means which provide a closed path for propagation of electromagnetic waves with the path having straight line segments between the reflecting means with one of the reflecting means being partially transmitting and means for producing one or more electrical signals in response to the electromagnetic waves propagating along the closed path wherein the signal producing means operates on portions of the electromagnetic waves transmitted by the partially transmitting one of the reflecting means with the angle between one of the electromagnetic waves incident upon the partially transmitting reflecting means being thirty degrees or less. The combination may further include means for delaying waves propagating in one direction along the path by a different amount of time than waves traveling in the other direction along the path. The delaying means may be a Faraday rotator. Preferably, the path is nonplanar and is provided within a block of solid material.

The invention may also be practiced by providing the combination of a block of solid material having a low thermal coefficient of expansion a plurality of straight passages being provided within the block intersecting one another to form a closed path for propagation for electromagnetic waves, a plurality of reflecting means one of which is positioned at each intersection between the passages to reflect the electromagnetic waves along the closed path with at least one reflecting means being partially transmitting with the angle between the passages intersecting at the partially transmitting one of the reflecting means being thirty degrees or less, and means for producing output signals in response to portions of the electromagnetic waves transmitted through the partially transmitting one of the reflecting means. The closed path is again preferably nonplanar providing an image rotation for the electromagnetic waves. The intersections of the passages are at the surface of the block.

The invention may otherwise be practiced by providing the combination of a block of solid material having a low thermal coefficient of expansion and a plurality of straight line passages within the block intersecting one another to form a nonplanar closed path for propagation of electromagnetic waves within the block with a plurality of reflecting means one of which is positioned at each intersection between the passages to reflect the electromagnetic waves between the passages with the reflecting means providing rotation for electromagnetic waves within the path. A Faraday rotator is disposed within the path. The Faraday rotator preferably comprises a thin slab of rare earth-doped glass the thickness of the crystal being less than 0.5 mm and means for providing a longitudinal magnetic field within the slab. The intersections between the passages are located upon the surfaces of the block. Each of the surfaces of the block in a plane perpendicular to a line bisecting the angle formed between the ones of the passages intersecting at each of the surfaces. A laser gain medium such as a gas mixture consisting of, for example, 8 parts $^3$He to 0.53 parts $^{20}$Ne to 0.47 parts $^{22}$Ne at a total pressure of 3 torr, should also be provided within the closed path. A plurality of electrode means for exciting the laser gain medium are also provided.

The objects of the invention can further be met by providing the combination of a block of solid material having at least one first bore therein for propagation of electromagnetic waves with the first bore having first and second colinear portions with the first portion lying between a surface of the block and the second portion and with the first having a larger cross section than the second portion, reflecting means positioned at the intersection of the first portion of the first bore with the surface of the block, and at least one electrode positioned in a second bore intersecting the second portion of the first bore. The distance between the intersection of the second bore with the second portion of the first bore to the intersection of the first and second portion of the first bore is preferably less than twice the diameter of the second portion of the first bore.

BRIEF DESCRIPTION OF THE DRAWINGS

FIG. 2 is a lower isometric view taken from a second corner of the device shown in FIG. 1;

FIG. 6 is a cross-sectional view showing the details of construction of the Faraday rotator device of the laser gyro system shown in FIG. 1;

FIG. 6A is a cross-sectional view showing portions of the Faraday rotator of FIG. 6;

FIG. 6B is a cross-sectional view showing portions of another embodiment of the Faraday rotator of FIG. 6A;

DESCRIPTION OF THE PREFERRED EMBODIMENTS

Figure 8:
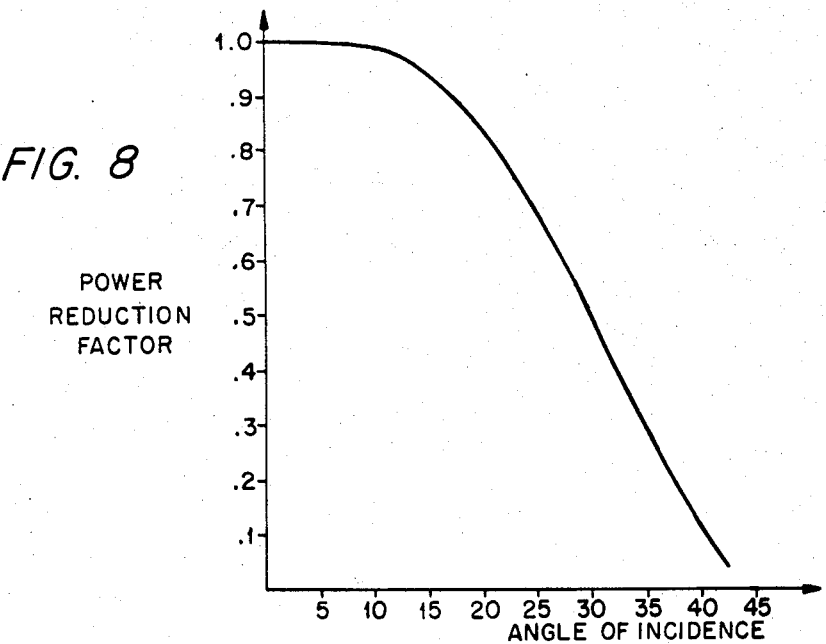
FIG. 8 is a graph showing the power reduction factor as a function of the angle of incidence of beams upon an output mirror structure.

Referring simultaneously to the views of FIGS. 1–4, the construction and operation of a laser gyroscope system in accordance with the teachings of the present invention will be described. Gyro block 102 forms the frame upon which the system is constructed. Gyro block 102 is preferably constructed with a material having a low thermal coefficient of expansion such as a glass-ceramic material to minimize the effects of temperature change upon the laser gyroscope system. A preferred commercially available material is sold under the name of Cer-Vit TM material C-101 by Owens-Illinois Company.

Gyro block 102 has nine substantially planar faces as shown in the various views of FIGS. 1-4. As shown most clearly in the views of FIGS. 3 and 4 which show gyro block 102 without the other components of the system, passages 108, 110, 112 and 114 are provided between four of the faces of gyro block 102. The passages define a nonplanar closed propagation path within laser gyro block 102.

Mirrors are provided upon faces 122, 124, 126 and 128, at the intersection of the passages with the faces. Substrates 140 and 142 having suitable reflecting surfaces provide the mirrors positioned upon faces 124 and 126 respectively. A mirrored surface is also provided directly adjacent face 128 in the front of path length control transducer 160. One of these mirrors should be concave to insure that the beams are stable and confined essentially to the center of the passages. Also, a partially transmitting mirror is provided upon face 122 to allow a portion of each beam traveling along the closed path within the gyro block 102 to be coupled into output optics 144. The structure of output optics 144 is disclosed in U.S. patent application Ser. No. 758,223 filed on Jan. 10, 1977 by the present inventors and assigned to the present assignee.

Because passages 108, 110, 112 and 114 define a nonplanar propagation path for the various beams within the system, each beam undergoes a polarization rotation as it passes around the closed path. Only beams of substantially circular polarization can exist in the nonplanar cavity of the invention. With circularly polarized beams, drift due to beam scattering or coupling from one beam to the other is minimized. This reduction occurs because light of one circular polarization state when scattered is not of the proper polarization to be coupled into and affect the other beams. For other types of light polarization this is not the case because there will always be some component of the scattered beam which will couple to other beams.

Figure 7:
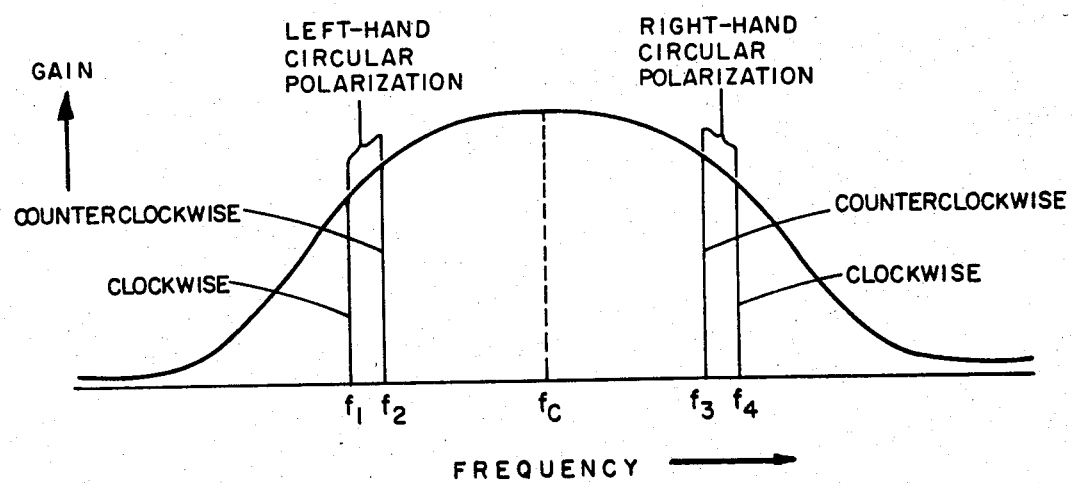
FIG. 7 is a graph showing the gain versus frequency of the gaseous laser medium employed with the laser gyro system of FIG. 1 indicating the relative positions of the frequencies of the four beams within the system.

In the preferred embodiment, the passages and reflecting mirrors are so arranged as to provide a substantially ninety-degree polarization rotation for the various beams. Because beams of right and left-hand circular polarization are rotated in opposite senses by this same amount independent of their direction of propagaton, a frequency splitting between beams of right and left-hand circular polarization must occur in order for the beams to resonate within the optical cavity. This is shown in FIG. 7 as the frequency split between the beams of left-hand and right-hand circular polarization. In the preferred embodiment, a ninety-degree rotation corresponding to a 180-degree relative phase shift is employed although other phase shifts as well may be used depending upon the frequency separation desired. Rotation will occur as long as the closed propagation path is nonplanar. The precise arrangement of the paths will determine the amount of rotation.

In the known systems of the prior art such as that described in the above-referenced patent to K. Andringa, the frequency splitting between beams of right and left-hand circular polarization was accomplished with the use of a block of solid material of significant optical thickness disposed in the propagation path. As discussed above, the presence of any solid material directly in the path of beam propagation provides scattering centers from which light may undesirably be coupled from one beam to another causing an error in the gyro output. The amount of coupling and thus error is thermally very sensitive. Hence, the output frequency of such devices was subject to a temperature dependent drift which could not be compensated for with a fixed output bias. With the present invention, the solid material which had been used for the crystal rotator has been completely eliminated from the beam propagation path thereby eliminating the sources of error and drift associated with the material.

To aid in understanding how the phase shift occurs, it is useful to imagine a linearly polarized beam propagating around the path. Suppose, for example, that the beam traveling between face 122 and face 124 is linearly polarized with the electric vector pointing in the upper direction. As the beam is reflected from the mirror provided upon face 124 the electric vector is still nearly pointed upward but with a slight forward tilt because passage 112 drops between face 124 and face 128. As the beam is reflected from the mirror upon face 128 it will be pointing nearly to the left with a slight downward tilt as would be seen in FIGS. 3 and 4. As the beam is reflected from face 151, the electric vector of the beam within passage 108 would point to the left with a slight upward slope again in the views of FIGS. 3 and 4. Thus, it may be seen that the beam as it arrives back at face 122 has experienced a polarization rotation of approximately ninety degrees. Of course, such a rotated linearly polarized beam cannot reinforce itself and resonate along the closed path. Only circularly polarized beams having a frequency shifted from the frequency at which such beams would resonate for a planar closed path of the same length will be resonant.

A two-frequency laser gyroscope may be constructed using a nonplanar propagation path to provide the only frequency splitting. No Faraday rotator or other such element is required in such an embodiment. To detect the rate of rotation, an output signal is produced by beating the extracted portions of the two beams together to form an output signal having a frequency equal to the difference in frequency between the two beams. At rest, the output signal will remain at some value $f_o$. For rotation in one direction the output signal will increase to a value $f_o + \Delta f$, where $\Delta f$ is proportional to the rate of rotation, and will decrease to a value of $f_o - \Delta f$ for rotation in the other direction. Use of circularly polarized waves in accordance with the invention significantly reduces cross-coupling due to backscattering so that the lock-in range diminishes permitting such a laser gyroscope to be used in many applications without complete elimination of lock in.

The second frequency splitting between the clockwise and counterclockwise beams is caused by Faraday rotator 156. Faraday rotator 156 is positioned within an aperture in face 151 as may be seen in the views of FIGS. 2 and 4. The details of the construction of Faraday rotator 156 are seen in the views of FIGS. 6 and 6A. The Faraday rotator mount 154, preferably formed of the same material as laser gyro block 102, forms the base upon which the structure is constructed. Faraday rotator mount 154 has a central cylindrical portion with one end flanged to restrain lateral movement of the device within aperture 120 provided in laser gyro block 102. The other end of Faraday rotator mount 154 is cut away to leave a platform for mounting the active components. Aperture 155 is provided aligned with passage 112 and having substantially the same diameter as passage 112. Permanent magnet 166, of hollow cylindrical shape, is positioned around aperture 155. Within the aperture in permanent magnet 166 is aperture 155. Within the aperture in permanent magnet 166 is positioned slightly wedge-shaped Faraday rotator slab 165. As shown in FIGS. 6 and 6A, the cross-section of the second end portion, with both the permanent magnet and slab mounted thereon, is no greater than the cross-section of the central portion of the base member. Faraday rotator slab 165 may be preferably formed of a rare earth-doped glass or a similar high Verdet constant material. A Verdet constant of magnitude in excess of 0.25 min./cm./Oe. at the operating wavelength is preferred to reduce the thickness of the slab required to produce the desired amount of frequency splitting. It is desirable to use as thin a slab as possible because the amount of thermally induced drift in the output of the device has been found to be a strong positive function of the thickness of solid material in the path of the waves. A commercially available material is Hoya Optics, Inc. material no. FR-5. A thickness of 0.5 mm or less is preferred to reduce drift to an acceptable level.

Faraday rotator slab 165 is held against Faraday rotator mount 154 by coil spring 168. Pole piece 170, which is formed of unmagnetized ferromagnetic material, is held against permanent magnet 166 by the magnetic field of permanent magnet 166. Pole piece 170 has an aperture in the center thereof of substantially the same diameter as that of aperture 155 and passage 112 which is of slightly smaller diameter than the aperture within permanent magnet 166. Coil spring 168 is thus restrained by the portion of pole piece 170 extending within the aperture in permanent magnet 166.

In the alternate embodiment of FIG. 6B, two cylindrical permanent magnets 172 and 176 are positioned end-to-end with like poles adjacent one another at the juncture between the two magnets. The Faraday rotator slab 165 is placed adjacent one end of the two magnet pair. A longitudinal magnetic field is produced in the slab but this field attenuates rapidly upon moving a short distance away from the slab or magnets. This embodiment has the advantage that essentially no stray magnetic field is produced which could extend into the gaseous discharge region and, by the Zeeman effect, produce unwanted modes or frequency offset.

Besides providing the frequency splitting between the clockwise and counterclockwise circulating beams, Faraday rotator 156 performs a second function. Because of the close fit provided within aperture 120 in gyro block 102, Faraday rotator 156 blocks the longitudinal flow of gas through passage 112. Because there can be no net circulation of gas through the closed path, the possibility of circulation of scatter particles carried by the gas is substantially reduced. Both surfaces of Faraday rotator slab 165 are preferably provided with an anti-reflection coating to prevent backscattering of the incident radiation. Also, some reflection may be permitted with the reflected radiation utilized for the output signal. A partially transmitting mirror is not then required.

Figure 1:
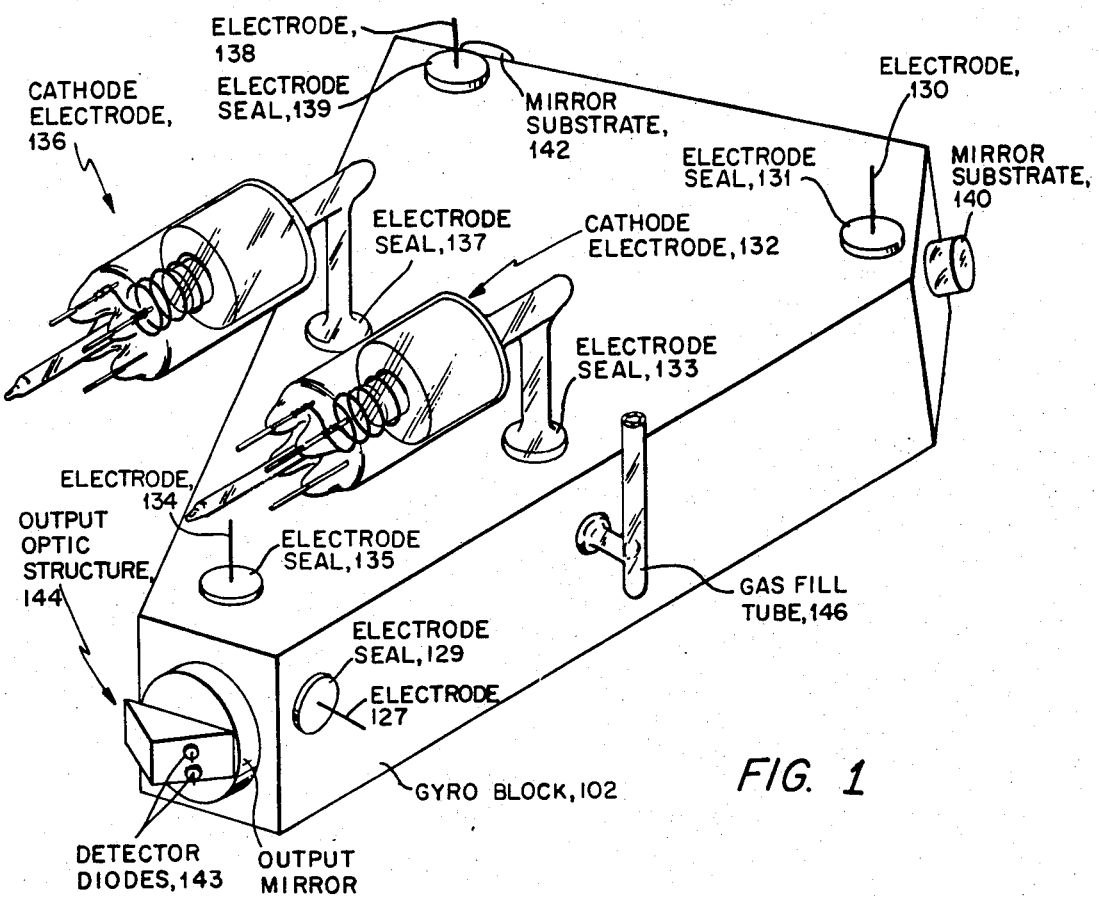
FIG. 1 shows a top isometric view taken from a first corner of a laser gyroscope system of the invention.
Figure 3:
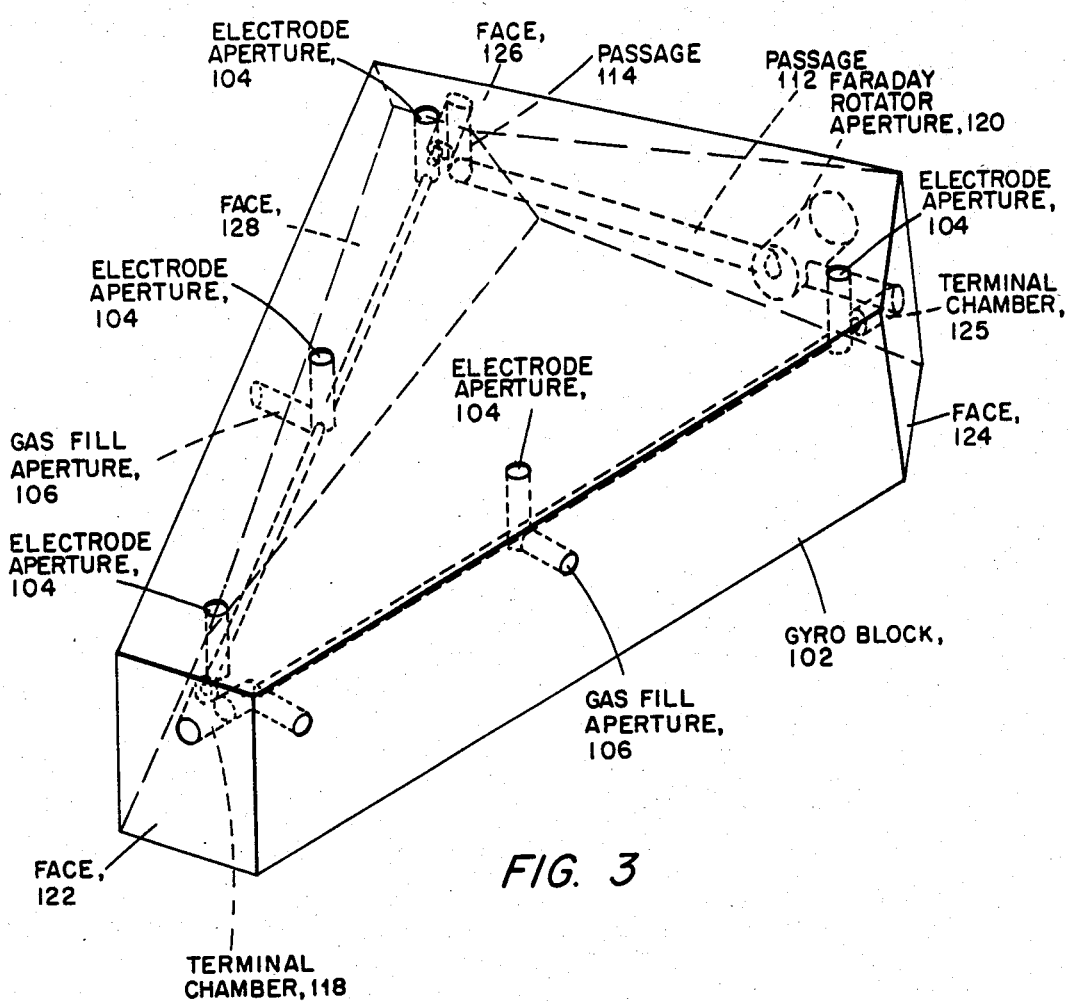
FIGS. 3 and 4 are isometric views of the gyro block of the system shown in FIG. 1 showing the internal construction and passages of the device therein.
Figure 4:
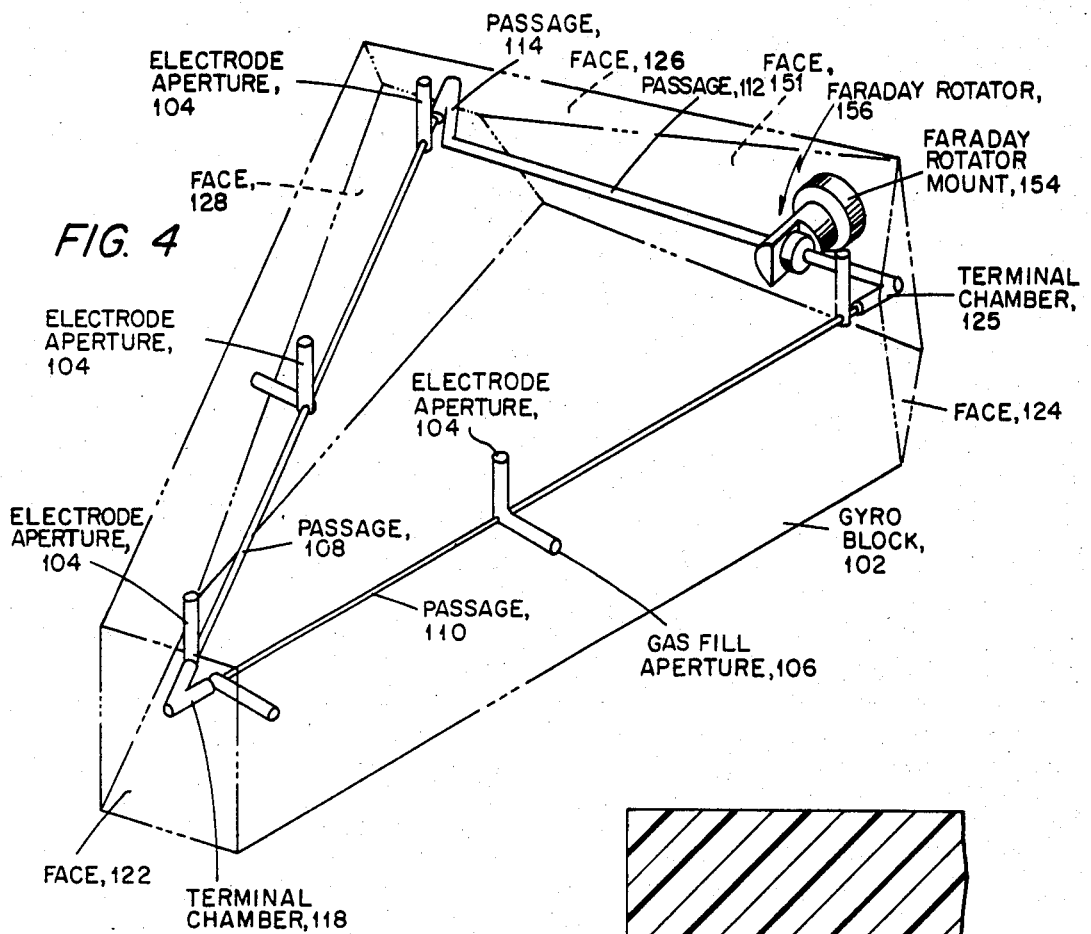

Referring again to the views of FIGS. 1, 3 and 4, it may be seen that a low angle of incidence is provided for the beams striking the partially transmitting mirror disposed upon face 122. The beams traveling within each passage 108, 110, 112 and 114 are generally circularly polarized. The nearer to normal that one of these beams strikes a reflecting mirror or a surface the nearer to circular will be the polarization of the beam transmitted through the mirror surface. As the angle of incidence moves away from the normal the paritally transmitted beams begin to assume an elliptical polarization.

As explained in the above-referenced U.S. patent application No. 758,223, if the beams within the output optics and detector structure are entirely circularly polarized there will be essentially no unwanted cross coupling and interference between the beams of the upper two frequencies and the beams of the lower two frequencies within the detector structure. As the amount of ellipticity increases, cross coupling begins to become evident and appears as an amplitude modulation upon the output signals from detector diodes 143. It has been discovered that the amount of the unwanted cross coupling is a nonlinear monotonically increasing function of the degree of ellipticity. It has been found that the cross coupling is relatively low for angles of incidence below approximately fifteen degrees. However, the amount of cross coupling increases quite rapidly above this angle of incidence. This cross coupling may be eliminated by means of a suitable polarization filter, but the available filtered power decreases as the unfiltered cross coupling increases.

Furthermore, as the angle of incidence of each beam upon the output mirror increases, the filtered power available at the detector diodes for each beam decreases. A calculated graph of power reduction factor, the ratio of power available at the detectors at a given angle of incidence to that available for the same beam normal to the mirror surface, is shown in FIG. 8 for the output structure described in the above-referenced U.S. patent application No. 758,223. As may readily be seen, the power reduction factor falls rapidly for angles of incidences greater than approximately fifteen degrees. Hence, in accordance with one aspect of the invention, the angle of incidence of the beams in passages 108 and 110 to the partially transmitting mirror disposed upon face 122 is made to be fifteen degrees or less. Alternately stated, the angle between passages 108 and 110 is thirty degrees or less.

Still referring to the views of FIGS. 1, 3 and 4, electrodes for exciting the gaseous gain medium disposed within passages 108 and 110 are positioned within electrode apertures 104. Preferably, center cathode electrodes 132 and 136 are connected to the negative terminal of an external power supply while electrodes 127, 130, 134 and 138 are connected to the positive terminal. The cathode electrodes are in the form of hollow metal cylinders capped at the end most distant from the seal to the laser gyro block 102 while the positive electrodes are in the form of metal rods extending into the various electrode apertures 104. With this connection, the current flows outward toward electrodes 132 and 136 in two opposed directions within a single passage. Negative electrode 136 is preferably located midway between positive electrodes 134 and 138 as negative electrode 132 is located midway between positive electrodes 130 and 127. In this manner, because a beam traversing one of the passages in which the electrodes are located passes through equal lengths of current flow of opposite direction, the effects of drag on the beam caused by unequal current flow through the gaseous gain medium are substantially eliminated. However, because of manufacturing tolerances in the positions of the various electrodes the distances between the positive and two negative electrodes in each passage may not be precisely equal. To compensate for the inequality, the current flow between the positive electrodes and thereto adjacent negative electrodes may be made unequal.

The gaseous gain medium which fills passages 108, 110, 112 and 114 is supplied through gas fill aperture 106 through gas fill tube 146 from an external gas source. A mixture $^3$He, $^{20}$Ne and $^{22}$Ne in the ratio of 8:0.53:0.47 is preferred.

Figure 5:
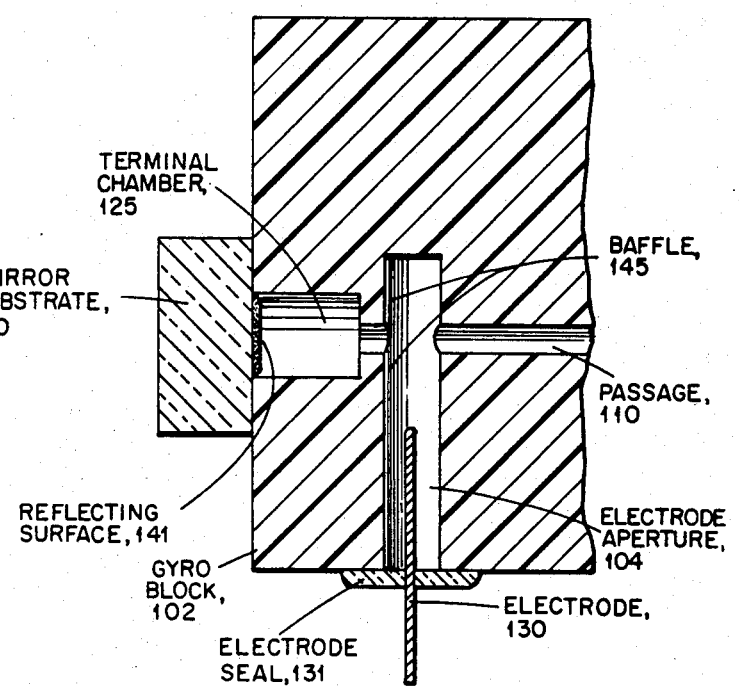
FIG. 5 is a cross-sectional view showing the internal construction of the system shown in FIG. 1 in the region of one of the terminal chambers and mirror substrate.

The details of construction of the laser gyroscope system in the region of one of the positive electrodes are shown in detail in the cross-sectional view of FIG. 5. Metal electrode 130, held in place by glass electrode seal 131, is positioned within electrode aperture 104. Electrode 130 extends somewhat more than half way between the surface of gyro block 102 and passage 110. Electrode aperture 104 intersects passage 110 preferably at a right angle. Terminal chamber 125 is formed between the surface of gyro block 102 upon which is positioned mirror substrate 140. Terminal chamber 125 is cylindrical in shape having a diameter at least twice that of passage 110. Terminal chamber 125 and passage 110 are coaxial with one another. Because passage 110 extends slightly beyond electrode aperture 104 before intersecting with terminal chamber 125, a baffle 145 is formed between electrode 104 and terminal chamber 125.

In prior art system, no terminal chamber or baffle was provided. The passage way extended directly through the electrode apertures out to the surface of the laser gyro block. When the electrodes were excited, dust or other unwanted particles which may be produced such as by ion bombardment and sputtering of the laser gyro block would collect around the intersection of the electrode aperture and beam passageways. The suspended particles acted as scattering centers increasing the optical loss of the structure. In contrast, with the present invention it has been found that dust or other unwanted particles will not be suspended in the region of the intersection of electrode apertures 104 and passage 110. Thus, a potential source of drift is eliminated.

This concludes the description of the preferred embodiments of the invention. Although preferred embodiments have been disclosed, it is believed that numerous modifications and alterations thereto would be apparent to one having ordinary skill in the art without departing from the spirit and scope of the invention.

What is claimed is:

1. A Faraday rotator element for a laser gyroscope comprising in combination:
    a base support member having an aperture therein;
    a permanent magnet having an aperture therein, said aperture in said permanent magnet being aligned with said aperture in said base support member;
    a slab of rare earth-doped glass, said slab being positioned within said aperture in said permanent magnet, said slab and said permanent magnet being supported by said base member;
    a spring, said spring holding said slab against said base member; and
    a retaining member for said spring, said retaining member having an aperture therein aligned with said apertures in said base support member and said permanent magnet.

2. The combination of claim 1 wherein said spring comprises:
    a coil spring.

3. The combination of claim 1 wherein:
    said permanent magnet and said retaining member have substantially cylindrical inner and outer surfaces.

4. The combination of claim 3 wherein said retaining member comprises:
    a ferromagnetic material.

5. The Faraday rotator element of claim 1 wherein said base support member comprises:
    a substantially cylindrical central portion;
    a substantially cylindrical first end portion having a diameter greater than that of said central portion; and
    a second end portion, said aperture in said base number being in said second end portion, said second end portion having a substantially flat portion upon which is mounted said permanent magnet and said slab, and the longitudinal axes of said aperture in said base member and said permanent magnet being substantially perpendicular to the longitudinal axis of said central portion of said base member.

6. The Faraday rotator of claim 5 wherein:
    the cross-section of said second end portion, with said permanent magnet and slab mounted thereon, is no greater than the cross-section of said central portion of said base member.

* * * * *